(No Model.)

C. S. LOCKWOOD.
DOMINOS.

No. 273,559. Patented Mar. 6, 1883.

Witnesses:
Chas. C. Gill
Herman Gustow

Inventor:
Charles S. Lockwood
By his Attorney,
Rowland Cox

UNITED STATES PATENT OFFICE.

CHARLES S. LOCKWOOD, OF ALBANY, NEW YORK, ASSIGNOR TO THE BONSILATE COMPANY, (LIMITED,) OF SAME PLACE.

DOMINO.

SPECIFICATION forming part of Letters Patent No. 273,559, dated March 6, 1883.

Application filed September 8, 1882. (No model.)

*To all whom it may concern:*

Be it known that I, CHARLES S. LOCKWOOD, of Albany, in the county of Albany and State of New York, have invented a new and useful Improvement in Dominos, of which the following is a specification, reference being had to the accompanying drawings.

The invention has relation to improvements in dominos; and it consists in the production of a domino of two colors, formed in a single piece of plastic material, and of the process by means of which it is produced.

The distinctive novelty of the invention consists in forming a domino out of plastic material, the back and face of which are of different colors, and in the process by which the result is accomplished, the details of which are hereinafter set forth.

Figure 1:
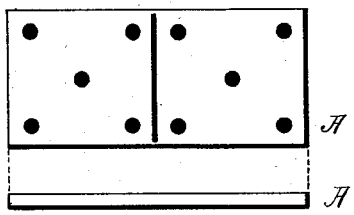
Figure 2:
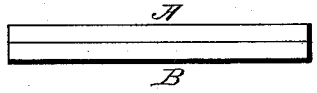

In the accompanying drawings, Figure 1 is a plan view of the face and edge of one layer of the material composing the domino, and Fig. 2 is an edge view of the completed domino.

In practicing the invention I first form the face of the domino with the eyes and crossbars, as shown in Fig. 1, in any convenient way, by molding it in a die of appropriate construction. The face having been formed as stated, I then apply a layer of material of any contrasting color, and introduce the face carrying the layer of contrasting color into the mold and again apply heat and pressure. The two materials of different colors will thus be firmly welded together, and the article as completed will have a finished appearance, the back and face being divided by a sharply-defined line. Different kinds of plastic materials may be employed with good results, and I recommend especially the use of the material known as "bonsilate," which I have employed with entirely satisfactory results. If desired, after the face has been formed, the eyes may be filled with black or any contrasting color, and the domino completed by introducing it into an ordinary rectangular die or mold having plain surfaces, in which event the layer of contrasting material will be applied as hereinbefore recited.

It will appear plain to persons skilled in the art that the foregoing process may be modified in some respects without departing from the spirit of the invention—as, for instance, instead of first forming the face and then applying the back, as recited, the back may be first formed and the face afterward applied; or, in lieu of both of these processes, two layers of different-colored powders may be placed in the mold at the same time and the domino thus formed at one operation.

Having thus described my invention, what I claim as new, and desire to secure by Letters Patent, is—

1. A domino of two colors formed in a single piece of plastic material, substantially as set forth.

2. The process herein described of forming dominos, which consists in welding two layers of material of different colors in a mold or die, substantially as set forth.

In testimony that I claim the foregoing improvement in dominos, as above described, I have hereunto set my hand this 26th day of June, 1882.

CHARLES S. LOCKWOOD.

Witnesses:
 ROBERT C. PRUYN,
 CHAS. M. HYATT.